United States Patent
Lanfranchi

(10) Patent No.: US 7,735,627 B2
(45) Date of Patent: Jun. 15, 2010

(54) PLASTIC BOTTLE UNSCRAMBLER WITH VACUUM SETTLING TABLES

(75) Inventor: Lino Lanfranchi, Collecchio (IT)

(73) Assignee: Lanfranchi S.r.l., Collecchio (IT)

( * ) Notice: Subject to any disclaimer, the term of this patent is extended or adjusted under 35 U.S.C. 154(b) by 26 days.

(21) Appl. No.: 12/238,493

(22) Filed: Sep. 26, 2008

(65) Prior Publication Data

US 2009/0078534 A1  Mar. 26, 2009

(30) Foreign Application Priority Data

Sep. 26, 2007  (IT) .......................... PR2007A0070

(51) Int. Cl.
 *B65G 47/24* (2006.01)
(52) U.S. Cl. .............. 198/392; 198/397.01; 198/397.02
(58) Field of Classification Search .................. 198/392, 198/393, 396, 397.01, 397.02, 397.05, 471.1
See application file for complete search history.

(56) References Cited

U.S. PATENT DOCUMENTS

| | | | | | |
|---|---|---|---|---|---|
| 3,295,659 | A | * | 1/1967 | Aidlin ................... | 198/397.05 |
| 4,130,194 | A | * | 12/1978 | Schindel et al. ........ | 198/397.02 |
| 4,681,209 | A | * | 7/1987 | Marti ...................... | 198/392 |
| 4,825,995 | A | * | 5/1989 | Nalbach .................. | 198/380 |
| 4,830,172 | A | * | 5/1989 | Hilton et al. ............. | 198/392 |
| 4,979,607 | A | * | 12/1990 | Fogg ........................ | 198/392 |
| 5,060,782 | A | * | 10/1991 | Marti ...................... | 198/392 |
| 5,065,852 | A | * | 11/1991 | Marti ...................... | 198/392 |
| 5,297,666 | A | * | 3/1994 | Marti Sala ............... | 198/380 |
| 5,549,189 | A | * | 8/1996 | Martisala ................ | 198/380 |
| 5,769,203 | A | * | 6/1998 | Marti Sala ............. | 198/397.01 |
| 6,098,781 | A | * | 8/2000 | Lanfranchi ............. | 198/400 |
| 6,302,258 | B1 | * | 10/2001 | Verona .................. | 198/392 |
| 6,467,609 | B1 | * | 10/2002 | Williams et al. ........ | 198/471.1 |
| 6,527,101 | B1 | * | 3/2003 | Miyamoto ............. | 198/397.04 |
| 6,557,691 | B2 | * | 5/2003 | Ronchi .................. | 198/400 |
| 7,134,540 | B1 | * | 11/2006 | Marti Sala ............. | 198/392 |
| 7,258,222 | B2 | * | 8/2007 | Marti Sala et al. ...... | 198/393 |
| 7,261,512 | B2 | * | 8/2007 | Lanfranchi ............. | 414/754 |
| 7,591,367 | B2 | * | 9/2009 | Perazzo et al. ......... | 198/550.2 |

* cited by examiner

*Primary Examiner*—Douglas A Hess
(74) *Attorney, Agent, or Firm*—Young & Thompson

(57) ABSTRACT

A plastic bottle unscrambler, wherein the tables (8) for settling and supporting the containers (2) in the cradles (6) comprise a box-like chamber having a housing (9) under the surface supporting the container (2), in which vacuum is applied, and at least one row of holes (12) arranged over the surface supporting the container (2) in the direction of feed of the cradles (6); as vacuum is applied in the housing (9), a negative pressure is created around the container (2) contained in the overlying cradle (6) to draw it and keep it lying against the outer wall (6b) of the cradle (6).

4 Claims, 2 Drawing Sheets

PLASTIC BOTTLE UNSCRAMBLER WITH VACUUM SETTLING TABLES

The present invention relates to a plastic bottle unscrambler with vacuum settling tables.

Namely, the machines concerned herein are orienting and aligning machines of the type comprising a cylindrical hopper (having a fixed or rotating conical bottom) into which the plastic containers or bottles are thrown in bulk and means are provided for conveying the containers or bottles in the horizontal position along the top edge of the hopper to be discharged into a plurality of open-bottom cradles, or trays and a corresponding number of discharge channels for tilting the bottles that fall from the cradles into vertical positions. A settling table or supporting track is interposed between the cradles and the channels, to somewhat act as a horizontal partition which ends where the container is required to fall from the cradle into the discharge channel.

Therefore, this settling table, which extends over a certain circumferential angular section, keeps the container lying in an approximately horizontal position in the cradle as it is translated to the end point where it falls into the discharge channel.

DESCRIPTION OF THE RELATED ART

The means for conveying the bottles in a horizontal position along the top edge of the cylindrical hopper may be of various types, and most typically consist of a fixed helical guide in the vicinity of the hopper, vanes integral with the hopper being provided between the helix and the hopper, such as the means disclosed in EP 374107.

In another type of machine, the means include a plurality of elevators disposed between the conical base and the inner wall of the rotating hopper, said elevators rotating with the hopper, as described and illustrated in the Italian patent 1,253,395.

In other types of machines, the hopper bottom is flat and inclined and rotates about its inclined axis, see U.S. Pat. No. 4,130,194, in which an inclined disc, with a plurality of cradles at its periphery, rotates within the hopper.

The drawbacks resulting from prior art machines are associated with the ability of the container or bottle to hold a stable position within the cradle before being discharged into the underlying channel, due to the high operating rate and the high speeds being required, which cause the empty plastic container to vibrate (and possibly come off the cradle) and take wrong positions which affect proper vertical alignment into the underlying channel, e.g. cause the containers to be deformed or flattened.

This drawback has been increasingly felt in small bottles, having an increasingly low weight.

SUMMARY OF THE INVENTION

The object of the present invention is to obviate the above drawbacks by providing one or more vacuum settling tables to draw and stabilize the container lying in the cable prior to its discharge into the underlying channel.

The advantages provided by the invention are associated with improved stabilization of the load to be erected, namely:
  improved performance, with a smaller number of containers accidentally coming off their cradles and flattened or damaged containers due to wrong positioning;
  higher throughput of the unscrambler at a lower speed, ensuring improved operation.

These objects and advantages are achieved by the bottle unscrambler with vacuum cradles of the present invention, which is characterized as set out in the annexed claims.

BRIEF DESCRIPTION OF THE DRAWINGS

This and other features will be more apparent from the following description of a few embodiments, which are shown by way of example and without limitation in the accompanying drawings, in which.

DETAILED DESCRIPTION OF THE PREFERRED EMBODIMENTS

Figure 1:
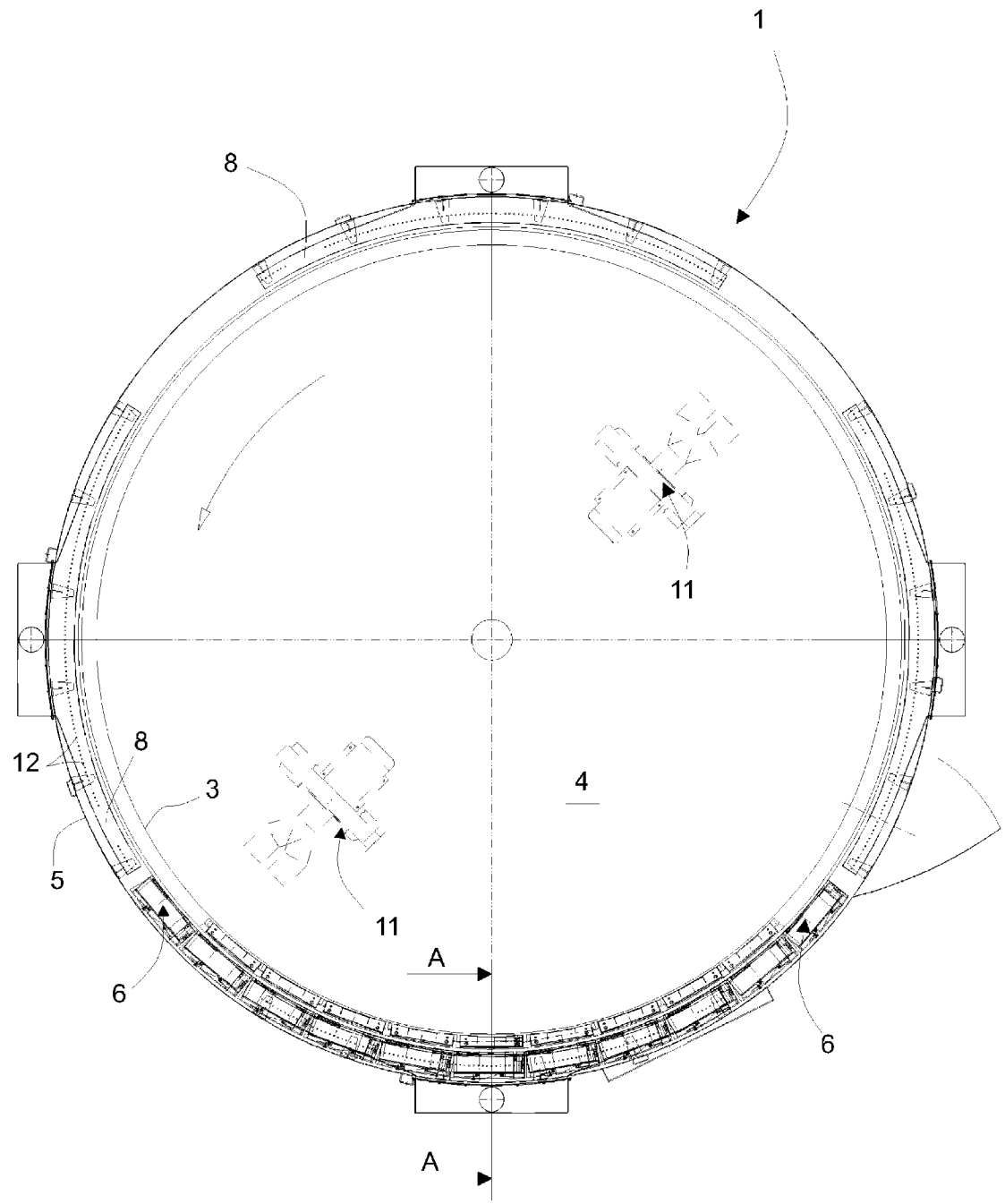
FIG. 1 is a top view of a bottle unscrambler with vacuum cradles of the present invention.

Referring to the figures, numeral 1 generally designates a plastic bottle or container unscrambler comprising a rotating inner wall 3 of a cylindrical hopper 4 for bulk loading of plastic containers 2.

Numeral 5 designates a fixed outer cylindrical wall concentric with the rotating inner wall 3.

An annular chamber is created between said walls 3 and 5, in which the cradles 6 and discharge channels 7 are placed.

Namely, all the cradles adapted to receive the plastic containers 2 in the horizontal position, as well as corresponding discharge channels 7 for aligning and maintaining the bottles that fall from the overlying cradles 6 in the vertical position, are attached to the outer face of the rotating inner wall 3.

One or more settling tables (four in this example), designated by numeral 8 are inserted between the cradles 6 and the discharge channels 7 to act as partitions to hold the container when needed and end where the container is required to fall from the cradle 6 into the discharge channel 7.

In other words, this table or track 8, which extends over a certain circumferential angular section, keeps the container lying in an approximately horizontal position in the cradle as it is translated along an arc of a circle to the end point where it falls into the discharge channel.

Namely, this table 8 is a box-like chamber of such a shape as to contain a housing 9 under the surface supporting the container 2 and is in turn connected, via flanges or equivalent means, to a suction pipe 10 connected to a vacuum unit 11 which in this example is located below the machine 1.

Also, at least one row of holes 12 is arranged over the surface supporting the container 2, in the direction of feed of the cradles 6, i.e. in the circumferential direction.

The holes 12 are preferably placed closer to the outer wall 6b of the cradle 6, to be offset for any type of container 2 contained therein, for the reasons explained below.

The above mentioned vacuum units 11 apply a certain degree of vacuum to the housing 9 of the table 8 and this action expands through the above mentioned holes 12 into the overlying cradle 6, thereby somewhat creating a negative pressure around the container 2 which is thereby more effectively drawn and held against the wall 6b of the cradle 6, i.e. the outer wall.

This provides improved stabilization of the container to be erected, and namely improved performance, with a smaller number of containers accidentally coming off their cradles and flattened or damaged containers due to wrong positioning.

While reference has been made herein to a row of holes, this aspect is not susceptible of limiting the requested protection, as multiple adjacent parallel rows may be provided, having equal or different hole diameters.

Furthermore, while reference has been made in this embodiment to an unscrambling machine 1 with four fall points, this aspect is not susceptible of limiting the requested protection, different numbers of guides 8 being also possibly provided, as required.

It will be appreciated from the above description that the above settling table may be used with any type of machine, i.e. either a vertical axis machine with a helical or elevator-operated bottle selection and elevation system, or a machine with a disc-type selection system having an axis of rotation inclined to the vertical, and thence designated "universal", i.e. adapted for use with any type of machine, with cradles and discharge channels, for instance, translating along a circular or substantially circular path.

Figure 2:
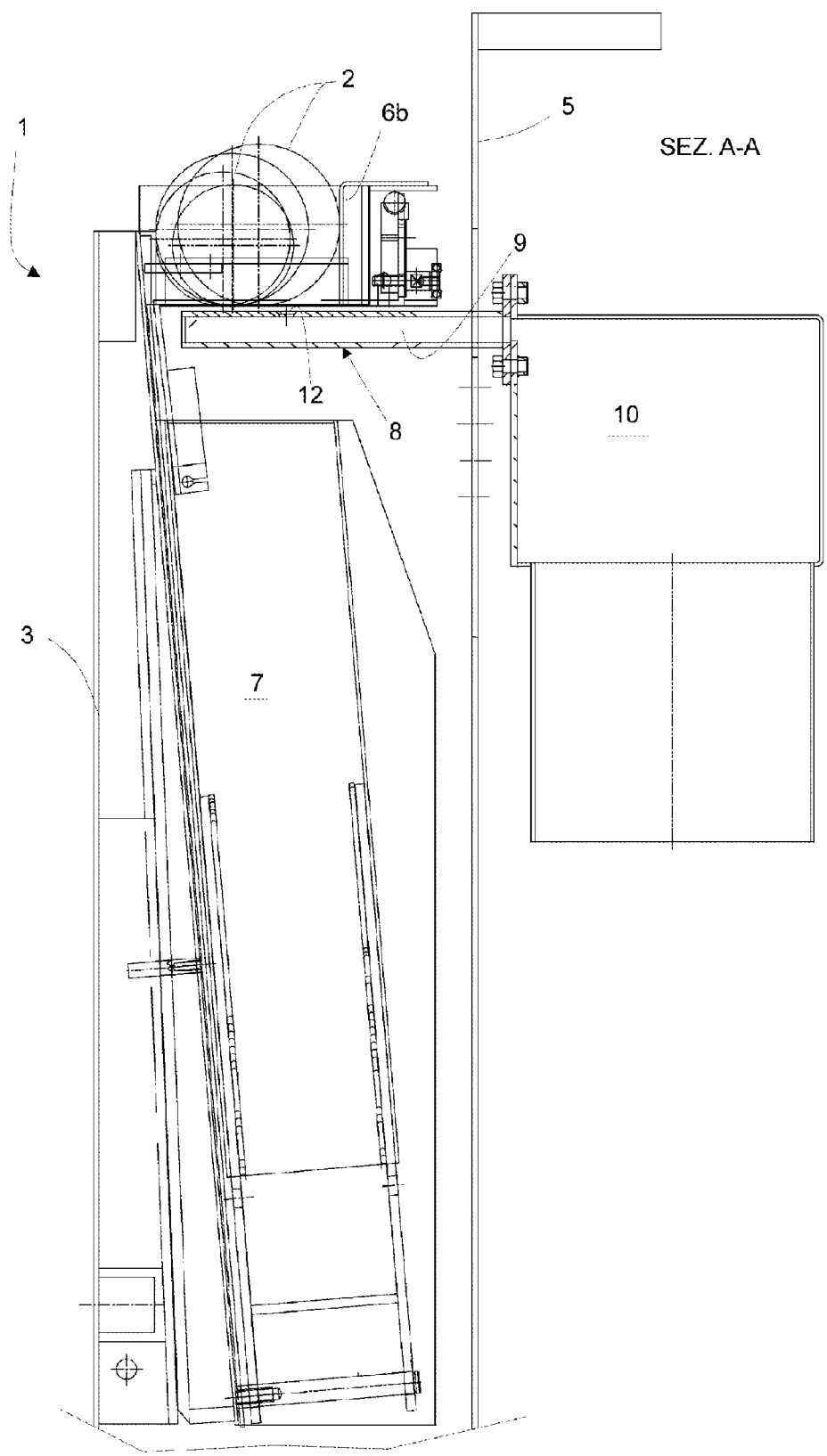
FIG. 2 shows the A-A section of FIG. 1.

In the embodiment of FIG. 2, the vacuum settling table is shown to be able to operate with containers 2 of different diameters, the holes 2 being always offset with respect to their center line.

The invention claimed is:

1. A plastic bottle unscrambler with vacuum settling tables comprising a rotating inner wall (3) of a cylindrical hopper (4) for bulk loading of plastic containers (2), a fixed cylindrical outer wall (5) concentric with the rotating inner wall (3), and an annular chamber between said inner wall (3) and said outer wall (5), cradles (6) and discharge channels (7) being located in said annular chamber, said cradles (6) being adapted to receive the plastic containers (2) in a horizontal position, and the discharge channels (7) being configured to align and maintain the bottles in a vertical position when the bottles fall from the cradles (6) overlying the discharge channels (7), with one or more container settling and supporting tables (8) being located between the cradles (6) and the discharge channels (7), wherein each of said one or more container settling and support tables (8) comprises
a. a box-like chamber having a housing (9), under a surface for supporting the container (2), in which vacuum is applied, and
b. at least one row of holes (12) arranged over the surface for supporting the container (2) and in a direction of feed of the cradles (6), and
wherein, as vacuum is applied in the housing (9), a negative pressure is created through the holes (12) around the container (2) contained in the overlying cradle (6) to draw the container (2) and keep the container (2) lying against the outer wall (6*b*) of the cradle (6).

2. The unscrambler as claimed in claim 1, wherein the row of holes (12) is placed closer to the outer wall (6*b*) of the cradle (6), to be offset for any type of container (2) contained therein.

3. The unscrambler as claimed in claim 1, wherein said vacuum is applied using one or more vacuum units (11) connected to said box-like chamber (8) with suction pipes (10).

4. The unscrambler as claimed in claim 1, wherein the settling and support tables (8) inserted between the cradles (6) and the discharge channels (7) act as partitions to hold the container when needed and end where the container is required to fall from the cradle (6) into the discharge channel (7).

* * * * *